United States Patent [19]
Kutauskas

[11] Patent Number: 5,330,252
[45] Date of Patent: Jul. 19, 1994

[54] DEVICE FOR CENTERING THE SEATING OF SMALL CHILDREN IN AN AUTOMOBILE

[76] Inventor: Edmund A. Kutauskas, 1320 New Ave., Elmont, N.Y. 11003

[21] Appl. No.: 76,840

[22] Filed: Jun. 15, 1993

[51] Int. Cl.⁵ .............................................. A47C 15/00
[52] U.S. Cl. .................... 297/232; 297/464; 297/485; 297/256.16; 280/801.1
[58] Field of Search .................. 297/256.16, 468, 469, 297/485, 248, 232, 464; 280/801 R

[56] References Cited
U.S. PATENT DOCUMENTS 3,328,080  6/1967  Dall ....................... 297/468
4,874,203  10/1989 Henley .................. 297/485 X
4,925,246  5/1990  Corcoran ............... 297/464 X

FOREIGN PATENT DOCUMENTS 3235456  3/1984  Fed. Rep. of Germany ...... 297/464
3545140  6/1987  Fed. Rep. of Germany ...... 280/801

Primary Examiner—Laurie K. Cranmer
Attorney, Agent, or Firm—Nicholas J. Garofalo

[57] ABSTRACT

An elongated device which may be strapped centrally of the rear seat of an automobile against relative movement by means of the usual seat belts that are attached to the rear seat, and to the central area of which device two small children may be strapped by means of a pair of seat belts attached to the device.

6 Claims, 2 Drawing Sheets

DEVICE FOR CENTERING THE SEATING OF SMALL CHILDREN IN AN AUTOMOBILE

BACKGROUND OF THE INVENTION

This invention relates to a device enabling the seating and strapping of two small children to the central area or the rear seat of an automobile.

The center of the rear seat is considered to be the safest place in an automobile at which to seat and strap a small child as a protective measure against possible injury occurring to the child in the event of a side impact collision of the vehicle. However, where there are two small children, only one of them can occupy the center position. The present invention is, accordingly, directed to providing a device whereby both children may be seated and strapped centrally of the rear seat.

BRIEF SUMMARY OF THE INVENTION

The invention provides an elongated angular device intended to be mounted in an automobile centrally of its rear seat and extending along the juncture of the seat and the upright back of the seat. The seated device is adapted by means of the three seat belts that are normally attached to the rear seat of the vehicle to be securely strapped centrally of the rear seat against being shifted endwise or forwardly from its seated position. The device is shorter than the length of the rear seat, so that in its seated condition its ends are spaced equally away from the inner sides of the vehicle. The device is provided with a pair of seat belts, whereby two small children may be strapped next to one another to the device after the device has been strapped to the rear seat.

The strapped condition of the device upon the rear seat and the strapped condition of the children to the device is such that the children are located centrally of the rear seat and are spaced to the extent possible from the inner sides of the vehicle, whereby the possibility of injury occurring to them is least in the event of the occurrence of a side impact collision of the vehicle.

Accordingly, a general object of this invention is to provide a device enabling two small children to be seated and strapped centrally of the rear seat of an automobile where the danger is least of possible injury occurring to the children in the event of a side impact collision of the vehicle.

And a more particular object of this invention is to provide an elongated device which may be strapped centrally of the rear seat of an automobile against relative movement by means of the usual seat belts that are attached to the rear seat, and to which device two small children may be strapped by means of a pair of seat belts attached to the device.

The foregoing and other objects, features and advantages of the invention will appear more fully hereinafter from a consideration of the accompanying description which follows, taken together with the accompanying drawing wherein an embodiment of the invention is illustrated. It is to be expressly understood, however, that the drawing is for purposes of illustration and description, and it is not to be construed as defining the limits of the invention.

DETAILED DESCRIPTION OF THE INVENTION

Figure 1:
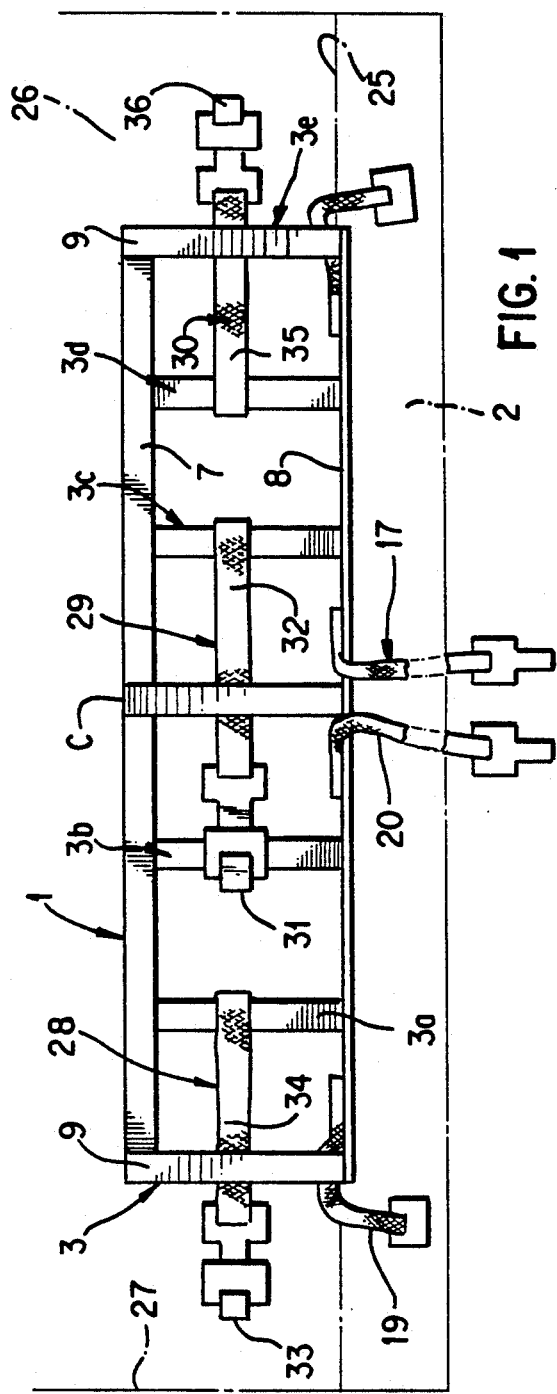
FIG. 1 is a front elevation view of a device embodying the invention; the device is illustrated as positioned centrally of the rear seat of an automobile in spaced relation to the inner sides of the vehicle and as strapped by means of the usual three seat belts of the vehicle against the back of the rear seat, the rear seat, its back and the inner sides of the vehicle being shown in broken line.

Reference is now directed to the accompanying drawing wherein a device 1 embodying the invention is shown (FIG. 1) as applied to the central area of the rear seat 2 (broken line) of an automobile.

Figure 3:
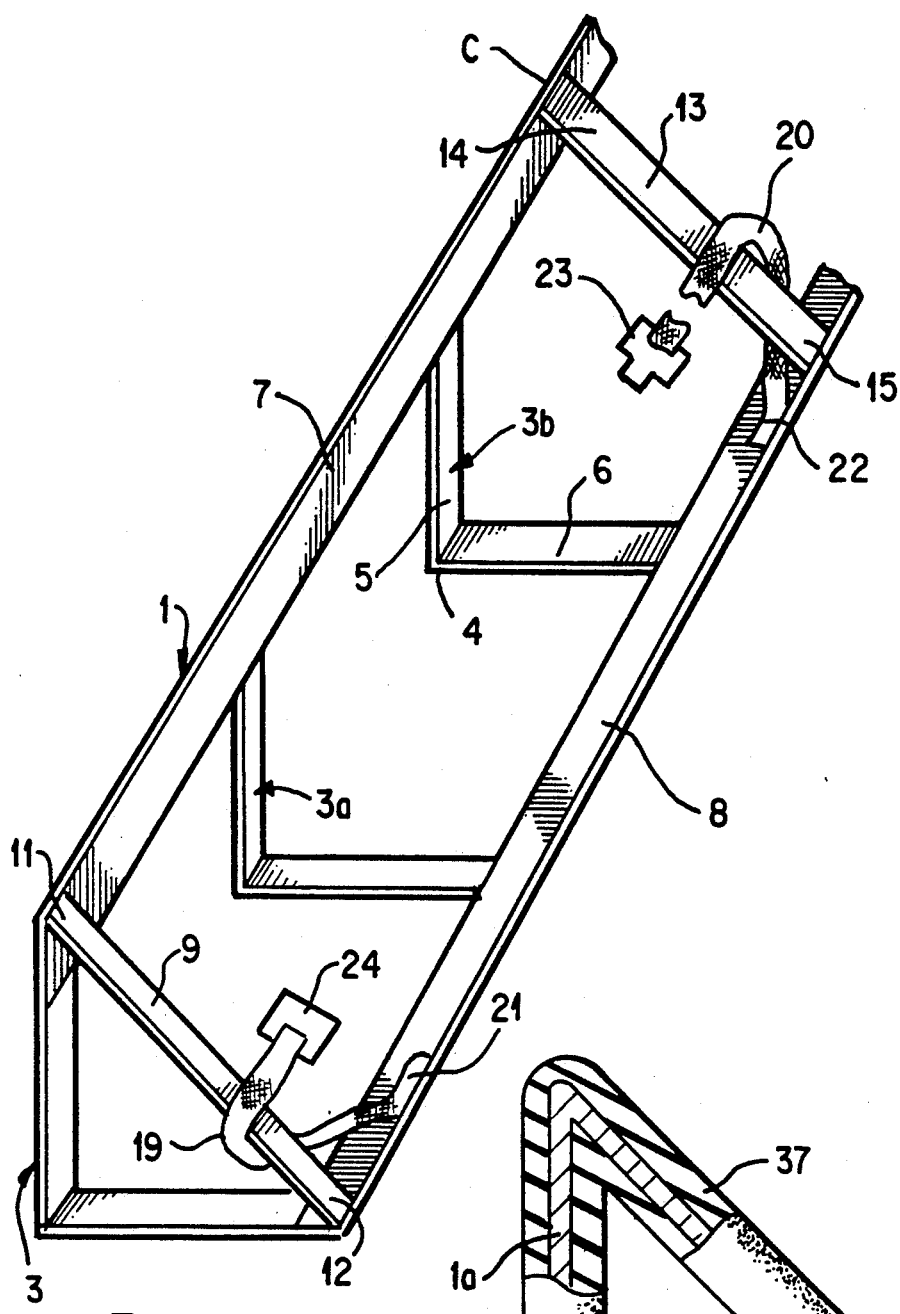
FIG. 3 is a perspective view on an enlarged scale of a left half of the device, the other half of the device, being the same, is broken away and not shown.

The device includes (FIGS. 1, 3) a plurality of supports of which those numbered 3, 3a and 3b are located in spaced relation to each other to the left of the center C of the device; and those supports numbered 3c, 3d and 3e are similarly located to the right of the center C. Each support is preferably of right angle form, having a vertex 4 at its bottom from which extends a flat upper arm 5 and a flat lower arm 6. Integral with and extending across the upper end of each of the upper arms 5 of the supports is an elongated strip 7; and integral with and extending across the end of each of the lower arms 6 of the supports is an elongated strip 8. The device is strengthened at each of its ends by means of a narrow inclined rib 9, the ends 11, 12 of which are respectively integral with the upper and lower strips 7, 8. The device is further strengthened at its center C by means of a narrow inclined rib 13, the ends 14, 15 of which are respectively integral with the upper and lower strips 7, 8. The resulting product is an elongated open walled device of angular form, the vertex of which is defined by the vertexes 4 of the several supports, an upper or one open side wall of which is defined by the laterally spaced upper arms 5 of the supports, a lower or other open side wall of which is defined by the laterally spaced lower arms 6 of the supports, and the side walls of which as defined are strengthened against bending away from each other by the inclined hypoteneuse ribs 9, 13.

Figure 2:
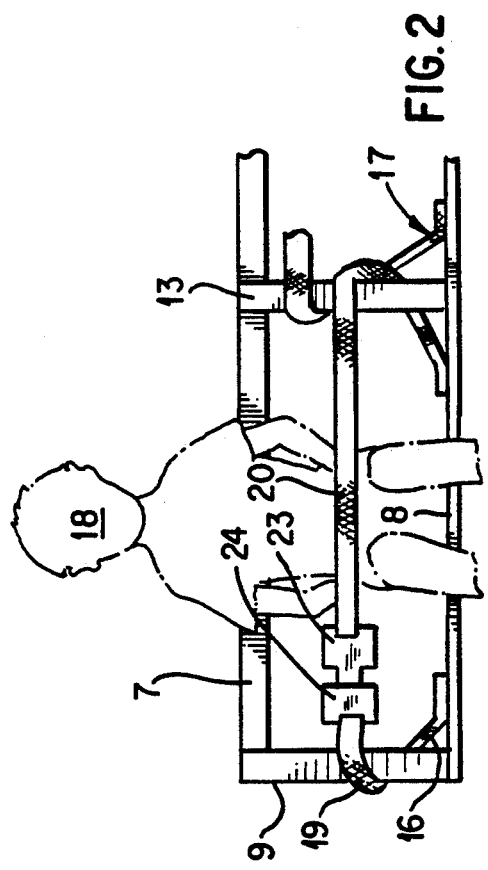
FIG. 2 is a front view of the left half of the device apart from the vehicle, showing a small child strapped to the device, a second small child would be similarly strapped to the right half, not shown, of the device.

Attached to the device is a pair of seat belts 16, 17 to be used for strapping two small children to the device, one to the left of its center C, and one to the right of its center. A small child 18 is shown in FIG. 2 as strapped to the left half of the device. The seat belt 16 serving the left half of the device comprises a pair of straps 19, 20, of which strap 19 is fixed at one end 21 upon strip 5 in the vicinity of the left end of the strip; and strap 20 is fixed at one end upon strip 8 in close proximity to the center rib 13. Straps 19 and 20 are adapted to be placed about the body of a small child 18 and, upon drawing a free end 23 of strap 20 into engagement with a terminal buckle 24 of strap 19, the straps are adapted to securely belt the child to the device, as appears in FIG. 2. The seat belt 17, serving the right half of the device and shown in part, is similar to the belt 16 in its relation to the device and in its mode of application to effect the seating of a second child to the right half of the device.

When the device is put to use, it is applied to the rear seat 2 of an automobile having a rear seat normally occupyable by three persons and having for each person a separate seat belt for strapping the person to the seat.

Before children are strapped to the device, it is positioned centrally of and along the length of the rear seat with the vertexes 4 of its supports along the juncture 25 of the seat and the upright back 26 of the seat; and with its ends equally spaced away from the inner sides 27 of the vehicle.

The three seat belts 28, 29 and 30 unitary with the vehicle and associated with its rear seat are used to strap the device securely in place, so that it is restrained from moving endwise or forwardly of its strapped position. To obtain this condition, the straps 31, 32 of the center seat belt 29 are engaged about the upper arms 5 of the two centrally located supports 3b and 3c of the device and are buckled tightly together; the straps 33, 34 of that seat belt 28 located at the left end of the rear seat are engaged and buckled tightly about the upper arm 5 of the support 3a located in the left area of the device; and the straps 35, 36 of that seat belt 30 located at the right end of the rear seat are engaged and buckled tightly about the upper arm 5 of the support 3d located in the right area of the device. The three seat belts 28, 29 and 30 in their tightened condition about the device exert opposing forces upon the device whereby the device is restrained against endwise and forward movement relative to the rear seat and the inner sides 27 of the vehicle.

After the device has been centered upon and strapped to the rear seat of the vehicle, a small child is seated upon the rear seat to the left of the center rib 13 of the device; and a second child is similarly seated to the right of the center rib 13 of the device. Each child will then be strapped to the device in the manner indicated in FIG. 2.

When the device is thus strapped centrally of the rear seat, and two children are then seated centrally of the rear seat and strapped to the device, the children are in a condition where the danger of injury occurring to them is the least in the event of the occurrence of a side impact collision of the vehicle with another vehicle or obstacle.

Figure 4:
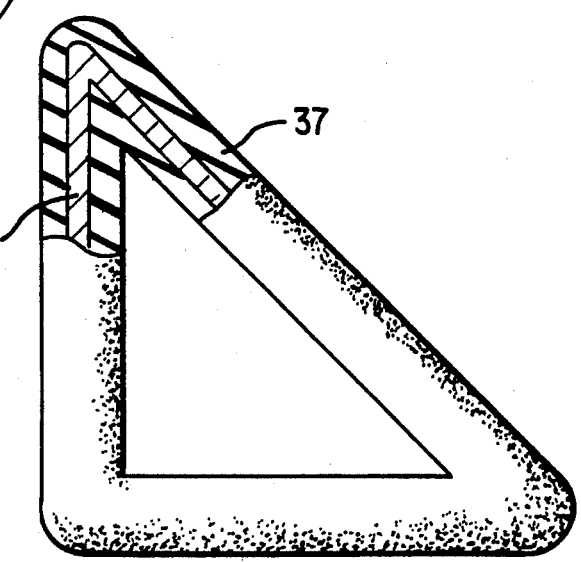
FIG. 4 is an enlarged end view of a device embodying the invention, illustrated in a form coated with a soft material, such as rubber.

The device is formed of material that is not readily subject to bending, so as to be suitable for the purpose intended. It is preferably formed of metal, such as steel. The device may be employed in a form, as indicated at 1a in the fragmentary end view of FIG. 4, coated with a cushion of soft material, such as rubber 37.

The average length of the rear seat occupyable my three persons in an automobile is approximately five feet. The length of the device of the present invention is shorter than the length of the rear seat so that when it is centered upon the rear seat its ends are approximately one foot from the inner sides of the vehicle. The length of the device is preferably three feet.

While an embodiment of the invention has been illustrated and described in detail, it is to be expressly understood that the invention is not limited thereto, and it is my intent, therefore, to claim the invention not only as shown and described but also in all such forms and modifications thereof as may be reasonably construed to fall within the spirit of the invention and the scope of the appended claims.

What is claimed is:

1. An elongated device which is angular in form, comprising a row of laterally spaced angle members each of which has an upper arm extending away from a vertex of the member and a lower arm extending away from the vertex, an elongated upper strip integral with and extending across an upper end of each of the upper arms, a lower elongated strip integral with and extending across an outer end of each of the lower arms, an inclined rib integral at an upper end thereof with an end of the upper strip and integral at a lower end with the lower strip, a second inclined rib integral at an upper end thereof with an opposite end of the upper strip and integral at a lower end with the lower strip, and a further inclined rib integral at an upper end thereof with the center of the upper strip and integral at a lower end with the center of the lower strip, the device seated at the center of the rear seat of an automobile with the vertexes of the angle members along the juncture of the rear seat and the back of the seat and secured in its seated condition by means of seat belts of the automobile fastened to the device, and a pair of seat belts mounted to the device of which one of the pair is belted about a child seated upon the rear seat or the automobile to the left of the center of the device and the other seat belt of the pair is adapted to be belted about a second child seated upon the rear seat to the right of the center of the device.

2. An elongated device as in claim 1, which is right angular in form, and the angle members of which are right angle members.

3. An elongated device as in claim 1, wherein the elongated strips, the angle members and the inclined ribs are of metal.

4. An elongated device as in claim 3, wherein the elongated strips, the angle members and the inclined ribs are coated with soft rubber.

5. In an automobile having a rear seat, a seat belt at a left end of the rear seat, a seat belt at a right end of the rear seat, and a seat belt at a central area of the rear seat, an elongated device of angle form removably seated upon a central area of the rear seat with its vertex along the juncture of the rear seat and a back of the rear seat, means at a left end area of the device secured to said left end seat belt, means at a right end area of the device secured to said right end seat belt, and means at a central area of the device secured to said central area seat belt, wherein two children are seated centrally of the rear seat and centrally of the device, a first seat belt mounted to the device is belted about one of the children, and a second seat belt mounted to the device is belted about the other child.

6. A device having a frame structure approximately three feet in length and seated centrally of the rear seat of an automobile the rear seat of which is approximately five feet in length; means fixed to an end area of the frame structure fastened to and tensioned by a seat belt of the vehicle toward a left end of the rear seat, means fixed to an opposite end area of the frame structure fastened to and tensioned by a second seat belt of the vehicle toward a right end of the rear seat, and means fixed to a central area of the frame structure fastened to and restrained by a third seat belt of the vehicle centrally of the rear seat against movement endwise of the rear seat; and a seat belt integral with the frame structure belted about a child seated upon the rear seat to the left of center of the frame, and a second seat belt integral with the frame structure belted about a second child seated upon the rear seat to the right of the center of the frame.

* * * * *